(12) United States Patent
Havskjold et al.

(10) Patent No.: US 9,766,534 B2
(45) Date of Patent: *Sep. 19, 2017

(54) SUSPENSION FOR CAMERA TRIM ENABLING THINNER CAMERA STACK

(71) Applicant: Apple Inc., Cupertino, CA (US)

(72) Inventors: David Glenn Havskjold, Portola Valley, CA (US); Anthony S. Montevirgen, Milpitas, CA (US); Tyson Benner Manullang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,281

(22) Filed: Jun. 17, 2016

(65) Prior Publication Data

US 2016/0299409 A1    Oct. 13, 2016

Related U.S. Application Data

(63) Continuation of application No. 14/156,359, filed on Jan. 15, 2014, now Pat. No. 9,395,602.

(51) Int. Cl.
*G03B 17/02* (2006.01)
*H04M 1/02* (2006.01)
*H04N 5/225* (2006.01)

(52) U.S. Cl.
CPC .......... *G03B 17/02* (2013.01); *H04M 1/0264* (2013.01); *H04N 5/2252* (2013.01); *H04N 5/2257* (2013.01); *Y10T 29/49002* (2015.01)

(58) Field of Classification Search
None
See application file for complete search history.

(56) References Cited

U.S. PATENT DOCUMENTS

| 8,570,737 | B2 | 10/2013 | Rayner |
| 9,395,602 | B2 * | 7/2016 | Havskjold ............ G03B 17/02 |
| 2009/0206077 | A1 | 8/2009 | Melmon et al. |
| 2010/0321497 | A1 * | 12/2010 | Onishi ................ B60R 1/10 348/148 |
| 2011/0110653 | A1 | 5/2011 | Stansbury |
| 2012/0233004 | A1 * | 9/2012 | Bercaw ............... G06Q 20/20 705/17 |
| 2013/0026689 | A1 | 1/2013 | Bloomfield et al. |

FOREIGN PATENT DOCUMENTS

WO    2013/181644 A1    12/2013

* cited by examiner

*Primary Examiner* — Clayton E Laballe
*Assistant Examiner* — Dennis Hancock
(74) *Attorney, Agent, or Firm* — Downey Brand LLP

(57) ABSTRACT

A camera assembly and a method for mounting it in a portable electronic device are provided. The assembly includes a camera module, and a camera trim coupled with the camera module. The camera assembly includes a first shock mount coupling the camera trim to an interior surface of the housing, and a second shock mount coupling the camera trim to an exterior surface of the housing. The first and second shock mounts cooperate to suspend an outer perimeter of the camera trim within an opening of the housing of the portable electronic device. A mobile telecommunications device including a camera assembly as above is also provided.

20 Claims, 5 Drawing Sheets

SUSPENSION FOR CAMERA TRIM ENABLING THINNER CAMERA STACK

CROSS-REFERENCE TO RELATED APPLICATIONS

This patent application is a continuation of U.S. patent application Ser. No. 14/156,359, filed Jan. 15, 2014, now U.S. Pat. No. 9,395,602, issued on Jul. 19, 2016, which is incorporated by reference herein in its entirety.

FIELD

The described embodiments relate generally to methods, devices, and systems for mounting camera assemblies in portable electronic devices. More particularly, embodiments disclosed herein relate to methods, devices and systems for using a trim suspension to protect a camera from impact shocks in portable electronic devices.

BACKGROUND

In the field of portable electronic devices, placing shock pads on the front side and the back side of a camera module enables the camera module mounted within the housing of the portable electronic device to survive drop events. The shock pads absorb and dampen the impact of a drop and prevent that impact from being directly translated to the camera. However, these shock pads usually include foam or elastomer materials that add to the overall z-thickness of the camera stack in the final product. In addition to increasing the form factor of the camera stack, shock absorbing materials and components may interfere with the optical alignment of a camera system, as the camera system may not recover an original configuration after a shock event has occurred. This is detrimental to optical alignment since the shock absorbing material may decouple optical components from alignment features such as a datum frame located in the housing of the portable electronic device. Accordingly, a datum frame is a feature that may be used as a reference for optical and mechanical alignment.

Therefore, what is desired is a system and a method for mounting a camera assembly in a portable electronic device that provides reliability and protection to the camera assembly and to the portable electronic device.

SUMMARY

In a first embodiment, a camera assembly for use in a portable electronic device includes at least the following: a camera module; and a camera trim coupled with the camera module. The camera assembly may also include a first shock mount coupling the camera trim to an interior surface of the housing, and a second shock mount coupling the camera trim to an exterior surface of the housing. To reduce the thickness of the camera assembly and make efficient use of space within the portable electronic device, the first and second shock mounts cooperate to suspend an outer perimeter of the camera trim within an opening of the housing of the portable electronic device.

In a second embodiment, a mobile telecommunications device includes: a housing to support electronic components, a cover glass disposed on one side of the housing, and a camera assembly including a window. The camera assembly is mounted on a side of the housing opposite the graphic user interface. The camera assembly includes: a camera, a trim attached to the camera, and a trim suspension coupling the trim to the housing. In order to have a compact camera assembly and to secure the camera assembly from impact shocks, the trim suspension includes a means to decouple an impact shock on the housing from the camera, the means to decouple the impact shock disposed along a periphery of the trim, within a thickness of the camera assembly.

In a third embodiment, a method for assembling a portable electronic device includes: forming an aperture in a housing for the portable electronic device and mounting a camera assembly in the aperture. Accordingly, the camera assembly includes a camera and a camera trim. The camera assembly is secured within the aperture by attaching the camera to the camera trim and coupling the camera trim with the housing of the portable electronic device using a means to isolate the camera from an impact shock on the housing. The method for assembling the portable electronic device further includes disposing the means to isolate the impact shock on the housing from the camera along a periphery of the trim, within a thickness of the camera assembly, mounting electronic components in the housing, and placing a cover glass in the housing.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION

Figure 1C:
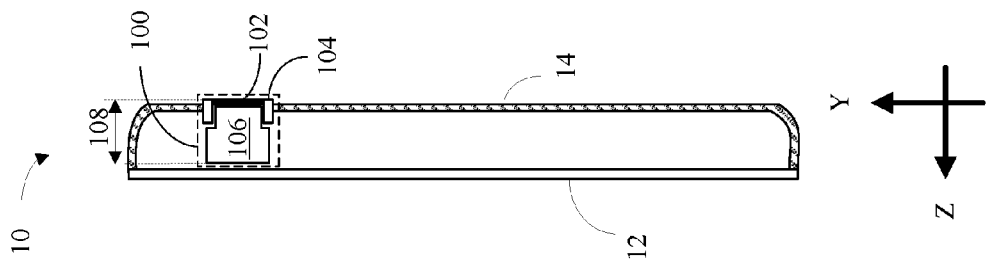
FIG. 1C illustrates a cross-sectional side view of a portable electronic device including a camera assembly according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the field of mounting camera assemblies to portable electronic devices, it is desirable to provide a mounting that can withstand device drops and other impact events. Accordingly, embodiments of a camera assembly as disclosed herein can sustain a high impact without affecting camera performance. For example, it is desirable that the mounting of the camera assembly maintains proper functionality even after dropping the portable electronic device to the ground. In some embodiments, a shock mount and a bumper coupled to a camera trim cooperate to absorb an impact before force from the impact is transmitted to the camera. In particular, some embodiments use shock mounts and bumpers to suspend the camera trim from an opening in the housing of the portable computing device. Thus, the camera trim and the optical elements in the camera itself can be rigidly coupled, thereby maintaining a relative alignment between the optical elements and the camera trim during and after a shock event. Accordingly, in some embodiments as disclosed herein the camera and the camera trim form a single unit that maintains optical alignment during and after a drop event. These embodiments allow an overall reduction in thickness of the camera mounting and provide a rigid support to the camera for establishing and maintaining optical alignment.

More generally, in the field of portable electronic devices it is also desirable to provide a space efficient mounting assembly so that the resulting form factor of the portable electronic device facilitates user handling. Embodiments disclosed herein provide a compact mounting assembly enabling a thinner overall portable electronic device, and a smaller camera trim bump out from the back of the housing of the portable electronic device. Moreover, in some embodiments it is desirable to provide a mounting that protects the camera assembly and also the portable electronic device. Accordingly, embodiments as disclosed herein protect the delicate optical alignment of the camera assembly by firmly securing the camera to the camera trim, where the camera trim may be used as a datum for optical alignment of the camera assembly. Also, a mounting as disclosed in some embodiments herein provides a seal to prevent the ingress of particulates and contaminants into the portable electronic device. The contaminants may include liquids and gases that may damage optical and electronic components inside the housing of the portable electronic device.

A portable electronic device in embodiments consistent with the present disclosure may be a mobile computer device such as a laptop, a notebook computer, or any other portable computer device. Further according to some embodiments, a portable electronic device may include a mobile telecommunications device, such as a cellular phone, or a smartphone, having the ability to wirelessly connect with a network.

Figure 1B:
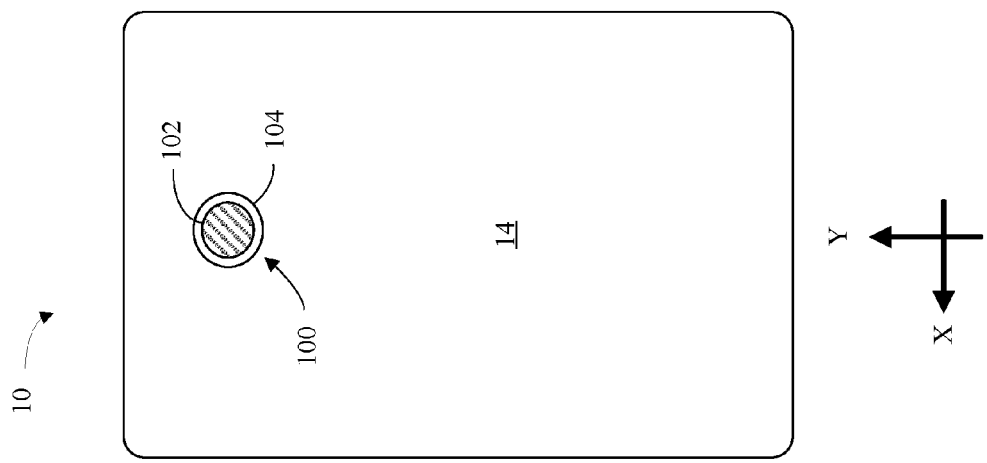
FIG. 1B illustrates a plan view of the back side of a portable electronic device including a camera assembly according to some embodiments.
Figure 1A:
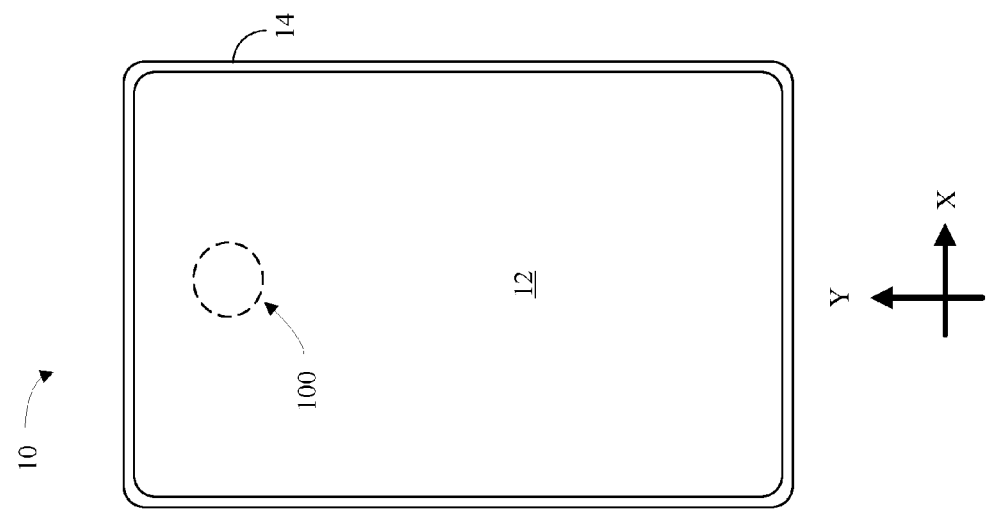
FIG. 1A illustrates a plan view of the front side of a portable electronic device including a camera assembly according to some embodiments.

FIG. 1A illustrates a plan view of the front side of a portable electronic device 10 including a camera assembly 100 according to some embodiments. A display with a touch based graphical user interface can be disposed beneath cover glass (CG) 12. CG 12 may include a glass surface to protect the display circuitry, and sensors such as an optical sensor, a near-field electromagnetic sensor, or a magnetic sensor disposed within portable electronic device 10. Camera assembly 100, CG 12, and other electronic components may be securely mounted onto housing 14. Electronic components mounted within housing 14 may include radio-frequency (RF) circuitry such as an RF-antenna, an RF-filter, and an RF-amplifier. Furthermore, electronic components mounted in housing 14 may include audio circuitry such as microphones, speakers, and amplifiers. Other electronic components mounted in housing 14 may include analog circuitry and digital circuitry, such as a digital signal processor. In some embodiments, housing 14 is made of a hard material, such as a metal (e.g., aluminum).

FIG. 1B illustrates a plan view of the back side of portable electronic device 10 including camera assembly 100, according to some embodiments. Accordingly, camera assembly 100 includes a window 102 and a camera trim 104. Camera trim 104 includes a frame that supports and mounts camera assembly 100 to the back side of housing 14. As used in the present disclosure, the terms 'front' side and 'back' side are not limiting, and refer only to a positioning of camera assembly 100 and CG 12 relative to housing 14, according to some embodiments.

FIG. 1C illustrates a cross-sectional side view of portable electronic device 10 including camera assembly 100, according to some embodiments. Camera assembly 100 includes a camera window 102, camera trim 104, and a camera module 106. FIG. 1C shows that camera assembly 100 has a thickness 108 in the Z-axis, which includes a thickness of camera module 106 and a thickness of camera window 102.

The Cartesian axes X, Y, and Z shown in FIGS. 1A-1C form a right-handed coordinate frame for illustration purposes only. Accordingly, portable electronic device 10 has a substantially planar profile in the XY plane, with a thickness along the Z axis. Furthermore, CG 12 is placed above camera assembly 100, which has camera window 102 in a bottom portion of housing 14. One of ordinary skill will recognize that the terms 'besides,' 'above,' and 'bottom' are not limiting of embodiments disclosed herein, and only used in the context of FIGS. 1A-1C to indicate a relative positioning of elements. Accordingly, camera module 106 in camera assembly 100 may have an optical axis aligned substantially along the Z-axis (i.e., perpendicular to the plane XY of CG 12). Camera window 102 may be aligned substantially parallel to the XY plane, approximately parallel to CG 12. While FIGS. 1A-1C illustrate a 'rear side' camera positioned along the back side of portable electronic device 10 with respect to CG 12 (in the −Z direction), camera assembly 100 as disclosed herein may be used in other configurations. For example, in some embodiments camera assembly 100 may be placed in the 'front side' of a portable electronic device. Further according to some embodiments, a camera assembly 100 may be mounted in the front side of a video conferencing device.

Figure 2:
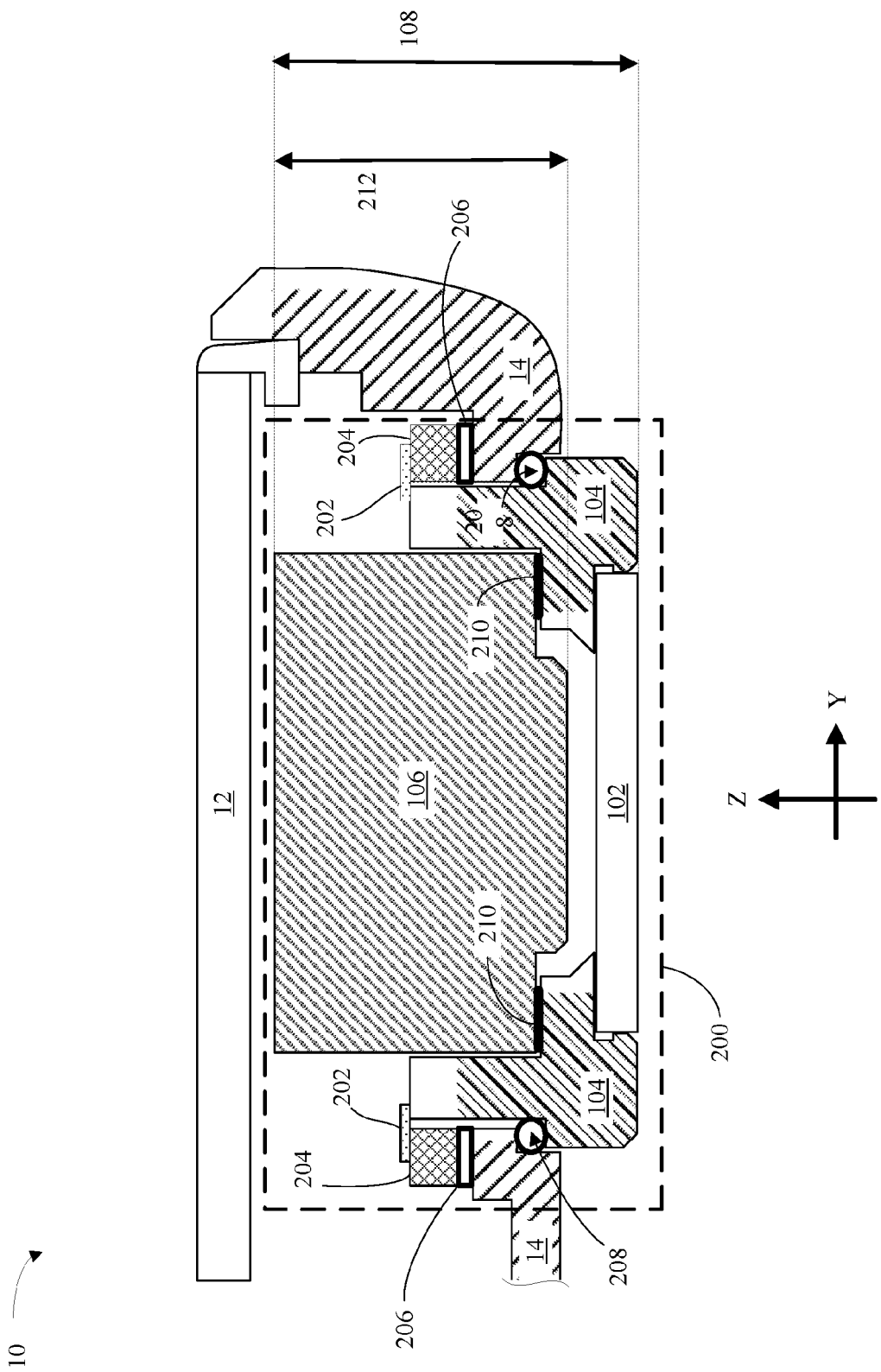
FIG. 2 illustrates a camera assembly including a trim suspension in a portable electronic device, according to some embodiments.

FIG. 2 illustrates camera assembly 200 including a camera trim 104 in a portable electronic device, according to some embodiments. Cartesian axes YZ in FIG. 2 are consistent with Cartesian axes XYZ in FIGS. 1A-1C. Camera assembly 200 may be mounted in portable electronic device 10 (cf. FIG. 1). Camera assembly 200 includes camera module 106 and camera trim 104 hard-stacked together such that a position of camera module 106 with respect to camera trim 104 is substantially fixed. The alignment of camera module 106 relative to camera trim 104 enhances optical precision and cosmetic appeal of portable electronic device 10. Accordingly, camera trim 104 enables a secure and compact mounting for camera assembly 200 onto housing 14 by a trim suspension, the trim suspension including a coupling member 202, a plate 204, a first shock mount 206, and a second shock mount 208. Without loss of generality, first shock mount 206 may be a washer, and second shock mount 208 may be an O-ring. Plate 204 is securely attached to camera trim 104 through coupling member 202. In some embodiments, coupling member 202 may be a welding spot, or a welding line fixedly coupling plate 204 to camera trim 104. Plate 204 is coupled to housing 14 through first shock mount 206. First shock mount 206 and second shock mount 208 are configured to couple camera trim 104 to housing 14 and isolate camera module 106 from an impact shock to the housing. In that regard, first shock mount 206 may be placed or 'trapped' between an inner portion of housing 14 and plate 204. Likewise, second shock mount 208 may be placed between an outer portion of housing 14 and camera trim 104. Accordingly, first shock mount 206 and second shock mount 208 are placed along a periphery of camera trim 104, without affecting an overall thickness of camera assembly 100 (in the Z-direction). In some embodiments, camera module 106 is fully contained within the circumference formed by first shock mount 206 and second shock mount 208 along a periphery of camera trim 104. In some embodiments, camera module 106 may be welded to camera trim 104. Furthermore, camera module 106 may be hard-stacked, or fixedly attached to camera trim 104 by an adhesive layer 210. In some embodiments, adhesive layer 210 can be a layer of pressure sensitive adhesive.

In some embodiments, first shock mount 206 is made of an elastomeric polymer or some other viscoelastic material that absorbs shock, mechanically insulating camera assembly 200 from impact shocks on housing 14. In some embodiments, first shock mount 206 may include a spring element for enhanced shock absorption. Further, according to some embodiments, first shock mount 206 may be fixedly attached to plate 204 and to housing 14 via an adhesive or glue. In that regard, first shock mount 206 may be formed of a viscoelastic adhesive material that secures camera assembly 100 to housing 14. Second shock mount 208 provides mechanical insulation to camera assembly 100 from impact shocks on housing 14. The mechanical insulation of camera trim 104 from housing 14 allows first shock mount 206 and second shock mount 208 to absorb and dampen the impact of drop events on housing 14. First shock mount 206 and second shock mount 208 may be formed of a viscoelastic material such as rubber, or another polymer that absorbs and damps vibrations.

In addition to providing shock absorption in the Z-direction, second shock mount 208 may have hermetic properties and act as an effective ingress seal to the interior of housing 14. Thus, external contaminants including liquids, gases, debris and particulates, may be prevented from accessing an interior cavity of portable electronic device 10. Thus, in some embodiments, second shock mount 208 insulates camera module 106 from ingress of contaminants that may damage optical and mechanical components in the camera. It will be apparent to those of ordinary skill that first shock mount 206 and second shock mount 208 may be replaced by any type of bumper and shock mounts, such as a spring, a cushion, or a spring washer. Camera module 106 is fixedly attached to camera trim 104 via adhesive layer 210. In some embodiments, camera module 106 may be biased towards camera trim 104 by some other fixtures, such as a bayonet assembly. Accordingly, camera module 106 and camera trim 104 are mechanically coupled, forming a compact unit.

Embodiments consistent with the present disclosure may use separate shock pads on either side ('top' and 'bottom' along the Z-axis in FIG. 2) of camera module 106. In some embodiments, camera module 106 may be attached to camera trim 104 without shock pads there between, thus reducing the total Z-stack of camera assembly 200 (e.g., thickness 108). Accordingly, thickness 108 includes a thickness 212 of camera module 106 independently of the thickness of first shock mount 206 and the thickness of second shock mount 208. Furthermore, impact shocks along the Z-direction are effectively suppressed or at least reduced by the suspension of camera trim 104 on housing 14. For example, in the event of a drop of portable electronic device 10 along the Z-axis with camera window 102 facing down, the impact of camera trim 104 on the floor compresses second shock mount 208 with a force in the Z-direction and stretches first shock mount 206. Second shock mount 208 then dissipates the compression energy and reduces the force transferred to camera module 106. A similar effect is provided by first shock mount 206 when the impact shock comes in the 'downward' direction (−Z) from CG 12 bending and making contact with camera module 106. Such configuration may occur when the user presses on CG 12 with a finger, or when portable electronic device 10 'crashes' onto a hard object on the side of CG 12. In such a situation, first shock mount 206 is compressed between plate 204 and housing 14. The dissipative properties of the washer material forming first shock mount 206 then reduce or eliminate the amplitude of the impact shock that is transferred to camera module 106. Furthermore, the resilience of second shock mount 208 and first shock mount 206 allows the recovery of the relative positioning of camera assembly 200 with respect to housing 14.

Moreover, during and after the transfer of the impact shock through housing 14, the relative alignment between camera window 102, camera module 106, and camera trim 104 is maintained because first shock mount 206 and second shock mount 208 insulate camera assembly 200 from the impact shock. Accordingly, the configuration of a trim suspension as illustrated in FIG. 2 results in first shock mount 206 and second shock mount 208 cooperating to provide a restoring force to camera assembly 200 upon impact. Furthermore, the form factor of camera system 100 along the Z direction is not affected by the thickness of either first shock mount 206 or of second shock mount 208 since the two trim suspension elements are removed to a periphery of camera system 100. Indeed, according to some embodiments, the thickness of first shock mount 206 and the diameter of second shock mount 208 do not add to the overall thickness of camera assembly 200 (along the Z direction).

Figure 3:
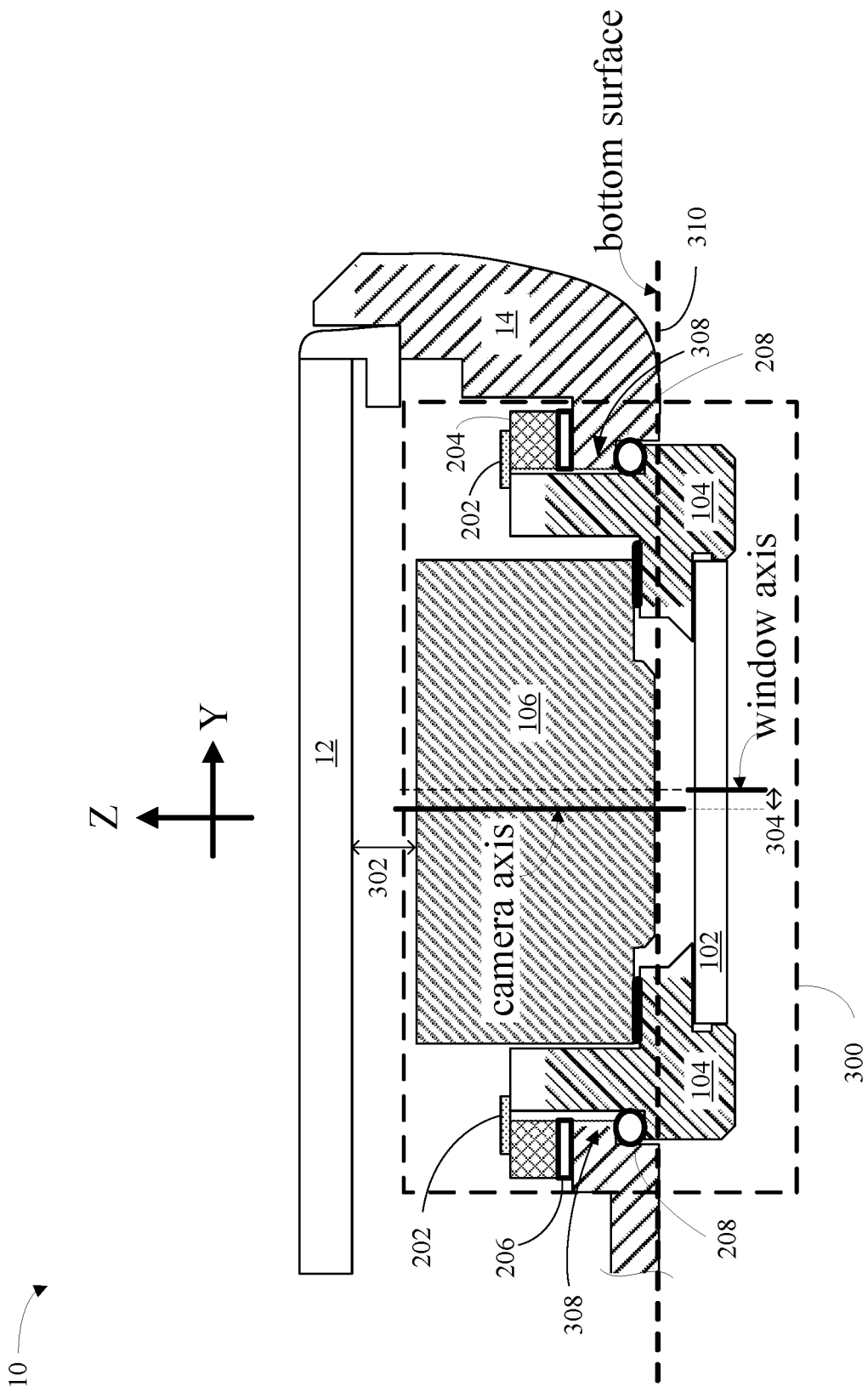
FIG. 3 illustrates a camera assembly including a trim suspension in a portable computing device, according to some embodiments.

FIG. 3 illustrates camera assembly 300 including camera trim 104 in a portable computing device, according to some embodiments. Cartesian axes YZ in FIG. 3 are consistent with Cartesian axes XYZ in FIGS. 1A-1C, and FIG. 2. Camera assembly 300 may be as camera assembly 100 or as camera assembly 200 described in detail above (cf. FIGS. 1 and 2). FIG. 3 illustrates a gap 302 separating a back end of camera module 106 from CG 12. Thus, camera module 106 is mechanically decoupled from CG 12 in camera assembly 300. Thus, when pressing on CG 12 during use of portable electronic device 10, gap 302 isolates camera module 106 from contact. Accordingly, gap 302 provides squeeze space for CG 12 in the back of camera module 106, without mechanically affecting camera module 106. Even in situations where a CG 12 bends severely enough to contact camera module 106, the resilience and elasticity of first shock mount 206 and second shock mount 208 reduce an amount of shock transmitted to camera module 106. By removing the first and second shock mounts 206 and 208 from the coupling between the camera module 106 and the camera trim 104, the relative orientation between camera window 102, camera module 106, and camera trim 104 is maintained through a shock event.

As illustrated in FIG. 3, camera assembly 300 includes a camera axis and a window axis, separated by a displacement 304. The camera axis defines an optical axis for components inside camera module 106, while the window axis defines an axis substantially perpendicular to window 102, passing through the geometrical center of window 102. The camera axis and the window axis are substantially parallel to each other, and to the Z-axis. It is desirable to align the camera axis with the window axis, thus reducing displacement 304 to a negligible value, or zero. A reduced displacement 304 results in a cosmetically improved portable electronic device. A reduced displacement 304 also relaxes tolerances for relative distances between camera module 106, camera trim 104, and housing 14. FIG. 3 shows an embodiment that reduces tolerance constraints, as camera module 106 and camera trim 104 are closer together and in a more rigid configuration when displacement 304 is reduced, or zero.

Moreover, according to some embodiments housing 14 may include a protrusion 308 to fit first shock mount 206 and second shock mount 208 above a bottom surface of housing 14. Accordingly, protrusion 308 may receive first shock mount 206 on an inside surface, and receive second shock mount 208 on an outside surface. The inside surface of protrusion 308 is part of an interior surface of housing 14, and the outside surface of protrusion 308 is part of an exterior surface of housing 14. Protrusion 308 forms the aperture where camera assembly 100 is placed, and provides an indentation configured to receive second shock mount 208 within the thickness of portable electronic device 10. The bottom surface of housing 14 may be defined by a plane 310 substantially parallel to the XY plane. Accordingly, a portion of camera trim 104, including window 102, may protrude slightly below plane 310. Since trim suspension elements such as first shock mount 206 and second shock mount 208 do not add to the thickness of camera system 100 (Z-dimension), the form factor of camera assembly 100 is reduced. This provides a larger gap 302, preventing contact between CG 12 and camera module 106 in case of a hard impact, or a bending force affecting CG 12.

Figure 4:
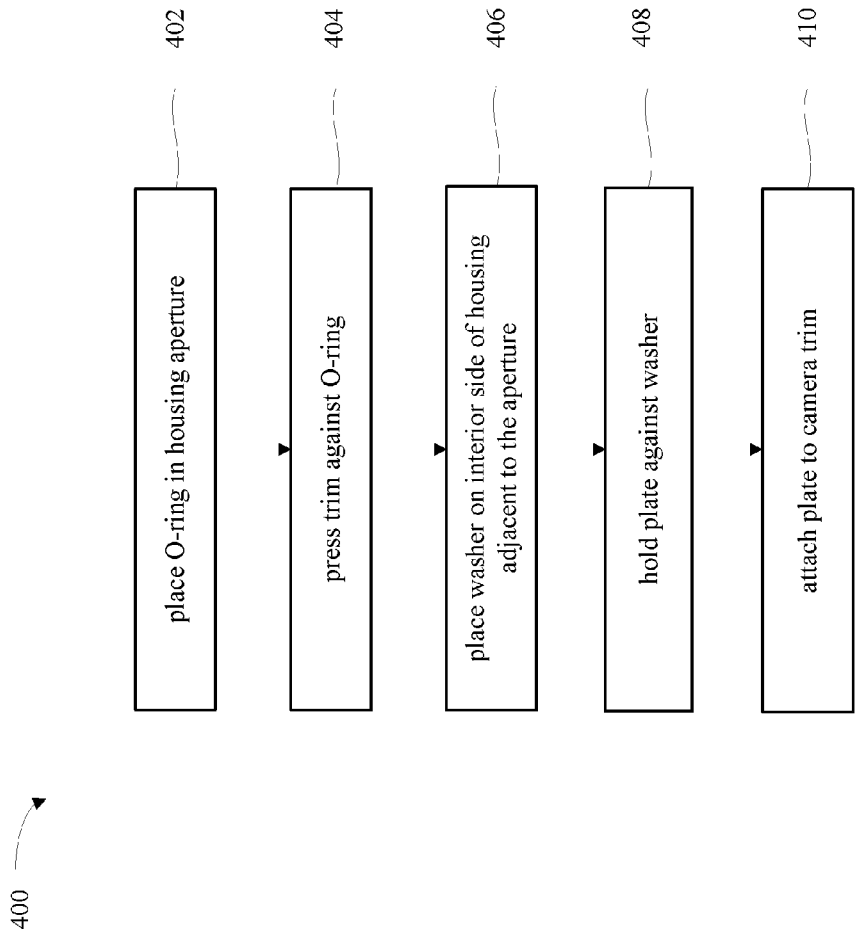
FIG. 4 illustrates a flowchart of a method for mounting a camera assembly in a portable electronic device, according to some embodiments.

FIG. 4 illustrates a flowchart describing a method 400 for mounting a camera assembly in a portable electronic device, according to some embodiments. The portable electronic device and the camera assembly in method 400 may be as described in detail above (e.g., portable electronic device 10, and camera assemblies 100, 200, or 300, cf. FIGS. 1A-1C, and 2-3). Accordingly, the portable electronic device may include a housing aperture where the camera assembly is mounted (e.g., housing 14, FIG. 1). The camera assembly may include a camera window, a camera trim, a camera module, and a plate (e.g., camera window 102, camera trim 104, camera module 106, and plate 204, cf. FIG. 2). The camera trim may have a trim suspension including a washer and an O-ring, as described in detail above (e.g., first shock mount 206 and second shock mount 208).

Step 402 includes placing the O-ring in the housing aperture. Step 404 includes pressing the camera trim against the O-ring using a first fixture. Step 406 includes placing the washer on an interior surface of the housing adjacent to the housing aperture. Step 408 includes holding a plate against an interior surface of the housing using a second fixture. In some embodiments, step 408 may include holding the plate adjacent to the washer and attaching the plate to the washer. Accordingly, attaching the plate to the washer may include gluing the plate to the washer using an adhesive, or using an adhesive property of the washer material itself. Step 410 includes attaching the plate to the camera trim. In some embodiments, step 410 may include welding the plate to the camera trim all the way around the aperture, or at selected points around the aperture. In some embodiments, step 410 may include threading the plate into the aperture. Further according to some embodiments, step 410 may include inserting the plate in a bayonet fixture attached to the housing aperture. Once the plate is attached to the camera trim, the fixtures used to hold the different components in place during mounting procedure 400 may be removed. One of ordinary skill will recognize that method 400 may include at least one of steps 402, 404, 406, 408, and 410 as described above, performed in any order. Furthermore, in some embodiments of method 400 two or more steps may be performed simultaneously, consistent with the concept described in FIG. 4.

Figure 5:
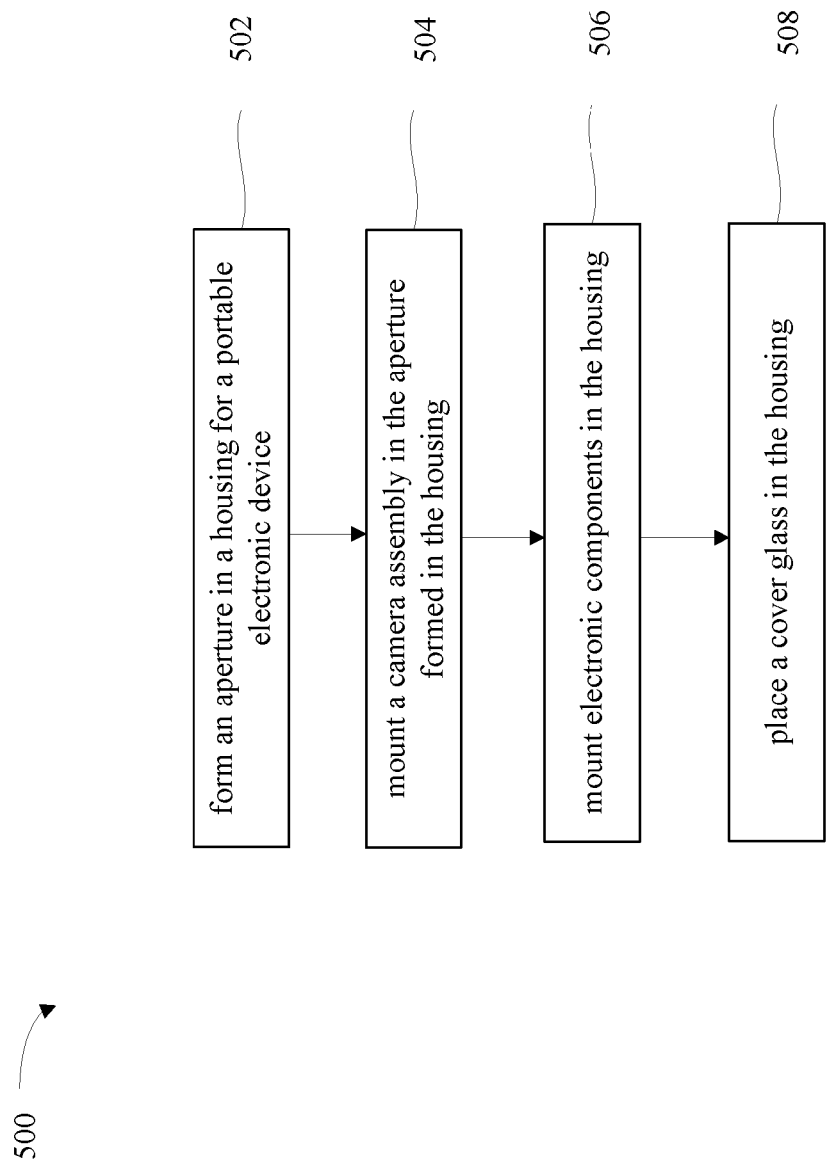
FIG. 5 illustrates a flowchart of a method for assembling a portable electronic device including a camera, according to some embodiments.

FIG. 5 illustrates a flowchart in a method 500 for mounting a camera assembly in a portable electronic device, according to some embodiments. The portable electronic device and the camera assembly in method 500 may be as described in detail above (e.g. portable electronic device 10, and camera assemblies 100, 200, and 300, cf. FIGS. 1A-1C, and 2-3). Accordingly, the portable electronic device may include a housing aperture where the camera assembly is mounted (e.g., housing 14, FIG. 1). The camera assembly may include a camera window, a camera trim, a camera module, and a plate (e.g., camera window 102, camera trim 104, camera module 106, and plate 204, cf. FIG. 2). The portable device may also include a cover glass (CG) placed on one side of the housing, opposite the camera window (e.g., CG 12, cf. FIGS. 1A-1C). The camera trim may have a trim suspension including a washer and an O-ring, as described in detail above (e.g., first shock mount 206 and second shock mount 208, cf. FIG. 2).

Step 502 includes forming an aperture in the housing for a portable electronic device. Step 504 includes mounting a camera assembly in the aperture formed in the housing. In that regard, step 504 may include performing at least some of steps 402, 404, 406, 408, and 410 discussed in detail above with regard to method 400 (cf. FIG. 4). Step 506 includes mounting electronic components in the housing. Accordingly, step 506 may include mounting radio-frequency (RF) antennas, sensors, power converters, digital signal processors, and a variety of other electronic components that may be used by the portable electronic device. For example, some of the electronic components mounted in step 506 may include audio circuitry such as speakers, microphones, and amplifiers. Furthermore, some of the electronic components mounted in step 506 may include RF circuitry such as RF-filters, RF-detectors, and RF-amplifiers. Step 508 may include placing a cover glass (CG) in the housing. One of ordinary skill will recognize that method 500 may include at least one of steps 502, 504, 506, and 508 as described above, performed in any order. Furthermore, in some embodiments of method 500 two or more steps may be performed simultaneously, consistent with the concept described in FIG. 5.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A camera assembly configured for use with a portable electronic device, the camera assembly comprising:
    a camera module;
    a camera trim coupled directly to the camera module; and
    one or more shock mounts configured to suspend the camera trim within an aperture in a housing of the portable electronic device.

2. The camera assembly of claim 1, wherein the one or more shock mounts are configured to dampen an impact shock on the housing from affecting the camera module.

3. The camera assembly of claim 1, wherein the one or more shock mounts couple the camera trim to the housing.

4. The camera assembly of claim 3, wherein at least one of the one or more shock mounts is configured to couple the camera trim to an exterior surface of the housing.

5. The camera assembly of claim 1, wherein at least one of the one or more shock mounts comprises a viscoelastic material.

6. The camera assembly of claim 1, further comprising:
    a camera window disposed on the camera trim.

7. The camera assembly of claim 6, wherein the camera assembly is configured for use such that the camera module is positioned between the camera window and a cover glass disposed on a side of the housing opposite a side of the housing having the camera window.

8. The camera assembly of claim 7, wherein the camera assembly is further configured for use such that the camera module is decoupled from the cover glass.

9. The camera assembly of claim 1, wherein at least one of the one or more shock mounts provides a seal to prevent ingress of contaminants into the housing.

10. A portable electronic device, comprising:
    a housing defining an internal volume, the housing having a first surface, a second surface opposite the first surface, and through hole that extends from the first surface to the second surface;
    a camera assembly carried by the housing, the camera assembly including a camera at least partially disposed in the internal volume, the camera assembly further including a camera trim secured with the camera;
    a first shock mount located in the internal volume along the first surface and coupled to the camera trim; and
    a second shock mount located on the second surface and coupled to the camera trim, wherein the camera assembly is suspended from the housing by the first shock mount and the second shock mount.

11. The portable electronic device of claim 10, wherein the second shock mount defines an ingress seal at an interface between the camera trim and the housing, the ingress seal configured to prevent a liquid from entering the internal volume via the through hole.

12. The portable electronic device of claim 10, wherein the first shock mount and the second shock mount are configured to dampen an impact shock on the housing and prevent affecting the camera.

13. The portable electronic device of claim 10, wherein at least one of first shock mount and the second shock mount provides a seal to prevent ingress of contaminants into the housing.

14. The portable electronic device of claim 10, wherein at least one of the first shock mount and the second shock mount includes a washer coupling a plate with the first surface of the housing.

15. The portable electronic device of claim 10, wherein the first shock mount and the second shock mount couple the camera trim to the housing.

16. The portable electronic device of claim 10, further comprising:
    a coupling member located in the internal volume and secured to the camera trim; and
    a plate secured to the coupling member and the first shock mount, wherein the camera assembly is further suspended from the housing by the coupling member and the plate.

17. The portable electronic device of claim 10, further comprising:
    a cover glass coupled to the housing at a first location of the housing; and
    a display assembly covered by the cover glass, wherein the through hole is located in a second location of the housing opposite the first location.

18. A method for assembling a portable electronic device, the method comprising:
    selecting a portable electronic device housing having a first side and a second side opposite the first side, wherein the second side has an aperture formed therethrough;
    attaching a camera to a camera trim;
    coupling the camera trim with the second side of the housing using at least one trim suspension element; and
    placing a cover glass at the first side of the housing such that the camera is positioned between the cover glass and the camera trim.

19. The method of claim 18, wherein coupling the camera trim includes placing a first trim suspension element on an interior surface of the housing and placing a second trim suspension element on an exterior surface of the housing.

20. The method of claim 19, wherein the first and second trim suspension elements are configured to dampen an impact shock on the housing from affecting the camera.

\* \* \* \* \*